(12) United States Patent
Paul et al.

(10) Patent No.: US 10,516,726 B2
(45) Date of Patent: Dec. 24, 2019

(54) DATA PARTITIONING IN INTERNET-OF-THINGS (IOT) NETWORK

(71) Applicant: TATA CONSULTANCY SERVICES LIMITED, Mumbai (IN)

(72) Inventors: Himadri Sekhar Paul, Kolkata (IN); Arijit Mukherjee, Kolkata (IN); Swarnava Dey, Kolkata (IN); Arpan Pal, Kolkata (IN); Ansuman Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 528 days.

(21) Appl. No.: 14/498,619

(22) Filed: Sep. 26, 2014

(65) Prior Publication Data
US 2015/0163289 A1  Jun. 11, 2015

(30) Foreign Application Priority Data
Dec. 6, 2013  (IN) .......................... 3836/MUM/2013

(51) Int. Cl.
*G06F 15/16* (2006.01)
*H04L 29/08* (2006.01)

(52) U.S. Cl.
CPC .............. *H04L 67/10* (2013.01); *H04L 67/02* (2013.01)

(58) Field of Classification Search
CPC ........ G06F 9/5016; G06F 9/5077; G06F 9/52; G06F 15/17337; G06F 2209/5017; G06F 9/5044; G06F 9/5066; H04L 67/10; H04L 67/32; H04L 67/327

USPC ......................................................... 709/201
See application file for complete search history.

(56) References Cited

U.S. PATENT DOCUMENTS

| | | | | |
|---|---|---|---|---|
| 2003/0195938 A1* | 10/2003 | Howard | ............... | G06F 9/5044 709/208 |
| 2004/0098447 A1* | 5/2004 | Verbeke | ............... | G06F 9/5055 709/201 |
| 2009/0049114 A1* | 2/2009 | Faraj | .................. | G06F 15/17337 709/201 |
| 2010/0029282 A1 | 2/2010 | Stamoulis et al. | | |
| 2010/0271375 A1* | 10/2010 | Diard | .................... | G06T 15/005 345/505 |
| 2011/0093852 A1* | 4/2011 | Li | .......................... | G06F 9/5066 718/100 |

(Continued)

*Primary Examiner* — Dustin Nguyen
*Assistant Examiner* — Hao H Nguyen
(74) *Attorney, Agent, or Firm* — Seed Intellectual Property Law Group LLP (57) ABSTRACT

A method for data partitioning in an internet-of-things (IoT) network is described. The method includes determining number of computing nodes in the IoT network capable of contributing in processing of a data set. At least one capacity parameter associated with each computing node in the IoT network and each communication link between a computing node and a data analytics system can be ascertained. The capacity parameter can indicate a computational capacity for each computing node and communication capacity for each communication link. An availability status, indicating temporal availability, of each of computing nodes and each communication link is determined. The data set is partitioned into subsets, based on the number of computing nodes, the capacity parameter and the availability status, for parallel processing of the subsets.

13 Claims, 2 Drawing Sheets

(56) References Cited

U.S. PATENT DOCUMENTS

| | | | |
|---|---|---|---|
| 2011/0099551 A1* | 4/2011 | Fahrig | G06F 9/5038 718/102 |
| 2011/0119364 A1 | 5/2011 | Zarkesh | |
| 2011/0302583 A1* | 12/2011 | Abadi | G06F 16/2471 718/102 |
| 2012/0159506 A1* | 6/2012 | Barham | G06F 9/5044 718/104 |
| 2013/0346988 A1* | 12/2013 | Bruno | G06F 9/5066 718/102 |
| 2014/0101221 A1* | 4/2014 | Alnafoosi | H04L 67/10 709/201 |
| 2014/0215487 A1* | 7/2014 | Cherkasova | G06F 9/5083 718/106 |
| 2014/0359348 A1* | 12/2014 | Volvovski | G06F 11/1092 714/6.22 |
| 2015/0163287 A1* | 6/2015 | Gooding | H04L 67/327 709/201 |
| 2016/0226955 A1* | 8/2016 | Moorthi | G06Q 10/06 |

* cited by examiner

DATA PARTITIONING IN INTERNET-OF-THINGS (IOT) NETWORK

TECHNICAL FIELD

The present subject matter relates, in general, to data partitioning and, particularly but not exclusively, to data partitioning in an internet-of-things (IoT) network.

BACKGROUND

Internet of Things (IoT) refers to a concept in which different communication devices, including computing devices, such as gateway devices, smart phones, and data collection devices, for example, sensors, are connected to each other over wired and wireless networks. Such devices usually are connected over the internet and form a distributed communication network referred to as an IoT network.

Generally, the data collection devices and the computing devices, collectively referred to as devices, in the IoT network are used for various purposes including collecting information, for example, for monitoring behavior of elements say persons, devices, and/or data in space and time. Such data that is collected through the devices in the IoT is analyzed and used for various kinds of actions, including prognosis, diagnosis, and control of the elements present and associated with the IoT network.

For such analysis, an analysis system associated with the IoT network is involved for handling the huge volume of data being received from various devices. Conventionally, for the analysis system to be able to handle such a large volume of data, parallel computing is employed to process the data.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to data partitioning in an internet-of-things (IoT) network.

Conventionally, the IoT network includes a plurality of data collection devices, such as sensors, from which data is collected and analyzed. For example, the results of data analysis can be used for achieving real-time awareness of the physical environment, assisting human decision making through deep analysis and data visualization, gathering information in diverse settings including natural ecosystems, buildings, and factories, and sending the information to one or more server stations for automation and control, say for automated control of closed (self-contained systems), control of consumption to optimize resource use across network and automated control in open environment with uncertainty.

For such analysis, an analysis infrastructure associated with the IoT network handles the huge volume of data being received from the various data collection devices. Such analysis of IoT data is generally associated with a deadline for completion to obtain a timely result and, if required, to take a timely responsive action based on the analysis. In order for the analysis system to be able to handle such a large volume of data, generally, parallel computing is employed to process the data. In such a technique, the data is partitioned and distributed over a plurality of computing nodes connected to the IoT network and part of the analysis infrastructure. For example, an application responsible for processing may not be inherently parallel, but by nature of the application, data can be processed in parallel. For such an application, data partitioning is applicable. Therefore, data partitioning can be understood as the division of a data set, at least some components of which can be processed in parallel, into smaller data sets which can be understood as smaller executable tasks, suitable to exploit the distributed infrastructure of IoT network. These tasks can be run in parallel, thereby reducing the overall completion time of the job.

Generally, the task of data partitioning can be modeled as having an input data set containing a plurality of data elements. One instance of the executable task associated with the input data set is executed on one or more data elements for processing each data element, say for analysis. The results of analysis are then combined based on the analysis task to obtain an overall result. For example, consider a task of searching a certain word in a huge repository of texts. In such a case, data in the repository can be divided into multiple subsets, and an instance of the search application can be run in parallel on each of the data subsets. Further, the results generated from each such search task are combined, say by concatenation, to obtain a final search result. In another example, where a certain pattern of numbers is to be searched and then added, the results of each instance of the search task running in parallel are added to obtain the final result. Therefore, the job of analyzing the entire data set can be reduced to n instances of parallel and independent execution of the analysis tasks, where each task analyzes a subset. Further, allocation of the data subsets to the computing nodes is determined as part of scheduling. Such scheduling is, in effect, based on the partitioning of the input data set.

As mentioned above, in the context of the IoT network, a wide variety of computing devices can participate as computing nodes in the above mentioned analysis infrastructure. Such computing devices can include high-end servers, desktops, laptops, edge devices, and smart phones. Certain devices from the pool of all devices connected in the IoT network voluntarily participate in data analysis and, therefore, intermittently contribute in computing depending on various factors, such based on their processing load and processing capability. Determining the intermittence of contribution may not be feasible as the dynamicity of the IoT network is very high.

In conventional techniques, the data partitioning and distribution or scheduling of tasks is generally achieved based on processing capability of the computing nodes in the IoT network. However, considering only the processing capability of the computing nodes may not provide an effective mode of data processing. For example, the interconnection between the computing devices and the partitioning and scheduling infrastructure may be through various kinds of communication links with different reliabilities and capabilities.

Such problems are conventionally addressed by employing a map-reduce technique for parallel execution tasks. According to this technique, the application for processing the data is divided into two phases. The first phase is called a map phase where data are partially analyzed and intermediate results are generated as key-value pairs. In the second phase, referred to as called reduce phase, the intermediate results are composed to generate the final result. However, in such cases, to make use of the map-reduce technique, the concerned application has to be re-written in map-reduce format. In addition, in case of certain type of applications, such as legacy applications, rewriting the application in map-reduce format may not be feasible.

The present subject matter relates to data partitioning in an internet-of-things (IoT) network, in accordance with an embodiment. In an implementation, the data partitioning is achieved among heterogeneous computing nodes connected in the IoT network. Such heterogeneous computing nodes can include computing devices, such as high-end servers, desktops, laptops, tablets, personal computers (PCs). In addition, the computing nodes can include the intermittently available computing nodes, such as mobile phones and personal digital assistants (PDAs). For example, such devices may move in or out of the network and may be available intermittently for assisting in computational functions in the IoT network. According to an aspect, the data partitioning is achieved based on the availability and computational capacity of the computing nodes and communication links associated with the computing nodes in the network. The communication links can be understood as wired or wireless communication channels in the IoT connecting the various devices in the IoT network. Further, based on the data partitioning, tasks for processing of data are scheduled among the computing nodes.

In an implementation, for initiating data partitioning, the number of computing nodes connected in the network to a data analytics system are determined. The data analytics system can be understood as the system in the IoT network which is responsible for achieving the processing of data for analytical purposes. To that effect, in an example, the data analytics system can regulate and control the data partitioning and scheduling of data processing tasks in the IoT. In an implementation, based on the number of computing nodes connected with IoT network, the number of data partitions to be achieved can be ascertained. In one case, the number of computing nodes can be determined at a given instant and the subsequent processing is based on the number of computing nodes determined at that instant until the number of computing nodes is determined again at a next given time instant.

Further, capacity parameters, indicative of the computational capacity, associated with each of the computing nodes are determined. In an example, the capacity parameters associated with the computing nodes can include processing speed of the computing node, available memory and associated bus speed, cache size, and operational load on that computing node at a given point in time. In addition, historical load on the computing node can be determined and future load can be predicted. In addition, capacity parameters associated with each of one or more communication links between the data analytics system and the computing nodes may be determined. In another example, the capacity parameters associated with links between the computing nodes can also be determined. In one case, the capacity parameters determined for the communication links can include data transfer rates for the communication link.

Further, according to an aspect, temporal availability of each computing node in the IoT network, at a given time instant, is determined. In one case, the determination of the availability can be event-based in which an event update is received from each computing node on the basis of which the availability status of the computing nodes is determined. For example, a computing device which completes processing of data can provide an event update that the processing is completed. Therefore, in said example, the completion of processing can be an event based on which the availability of the computing device can be determined. In another case, the determination of availability can be poll-based in which each computing node can be proactively queried or polled to determine availability status. Further, in one case, the determination of availability can be advertisement-based. In such a case, a computing node can advertise or broadcast availability status which can be captured by the data analytics system to ascertain the availability of the computing node. In addition, the availability status of each communication link between the data analytics system and the computing nodes can be determined. In an example, the availability status of each communication link can be determined in the same manner as described above. For instance, the availability of the communication link can be determined from the computing node connected to that communication link.

In addition, the availability status of each computing node and communication link can be determined based on historical availability data associated with each node and link. For instance, the availability of each node and link can be monitored and recorded for a predetermined period of time. Accordingly, in one example, future availability of each computing node and communication link, also referred to as network element, in the IoT network can be predicted say, by application of statistical analysis techniques on the historical data for availability obtained by monitoring each computing node and each communication link.

Once the capacity parameters and availability associated with each computing node and each communication link in the IoT network have been determined, based on the capacity parameters and the availability associated with each network element, and the number of network elements in the IoT network, a data partitioning scheme can be determined.

Further, the data analytics system can partition the data into subsets to be analyzed based on the partitioning scheme. In an implementation, the data partitioning scheme can be one of time reduction-based or cost reduction-based, or a combination thereof. Say, in one case, the partitioning of data can be achieved to reduce the overall time taken in processing and analysis of the entire data collected by the IoT network. In other case, the partitioning of data can be achieved to reduce overall cost associated with the processing and analysis of data. In the latter case, the data analytics system can take into account various costs, such as processing costs or costs incurred in acquiring the computing nodes, the communicating links, or both for the purpose of carrying out the processing of data. In yet another case, reduction of both time and cost can be a factor determining the partitioning scheme and achieving partitioning of data.

In addition, based on the partitioned data subsets and the computational capacity and availability of each network element, the data analytics system can achieve scheduling of analysis tasks at the computing nodes for processing of the data subsets. In an implementation, static scheduling techniques can be used for scheduling the data elements for processing.

Since the temporal availability of each communicating link and computing node that the data analytics system is considering for scheduling the task of data processing are taken into account while partitioning the data, the overall time, cost, or a combination of both associated with the data processing tasks can be reduced. Further, in addition to advertised availability of each node and link, the availability of the network elements can be determined by polling each such element and based on event-updates. As a result, the overall data partitioning is determined by taking into account all the computing nodes and communication links in the IoT network without omitting any computing node. As a result, the effectiveness of the data partitioning and scheduling of processing tasks is substantially high for processing the data.

These and other advantages of the present subject matter would be described in greater detail in conjunction with the following figures. While aspects of described systems and methods for data partitioning in an internet-of-things (IoT) network can be implemented in any number of different computing systems, environments, and/or configurations, the embodiments are described in the context of the following device(s).

Figure 1:
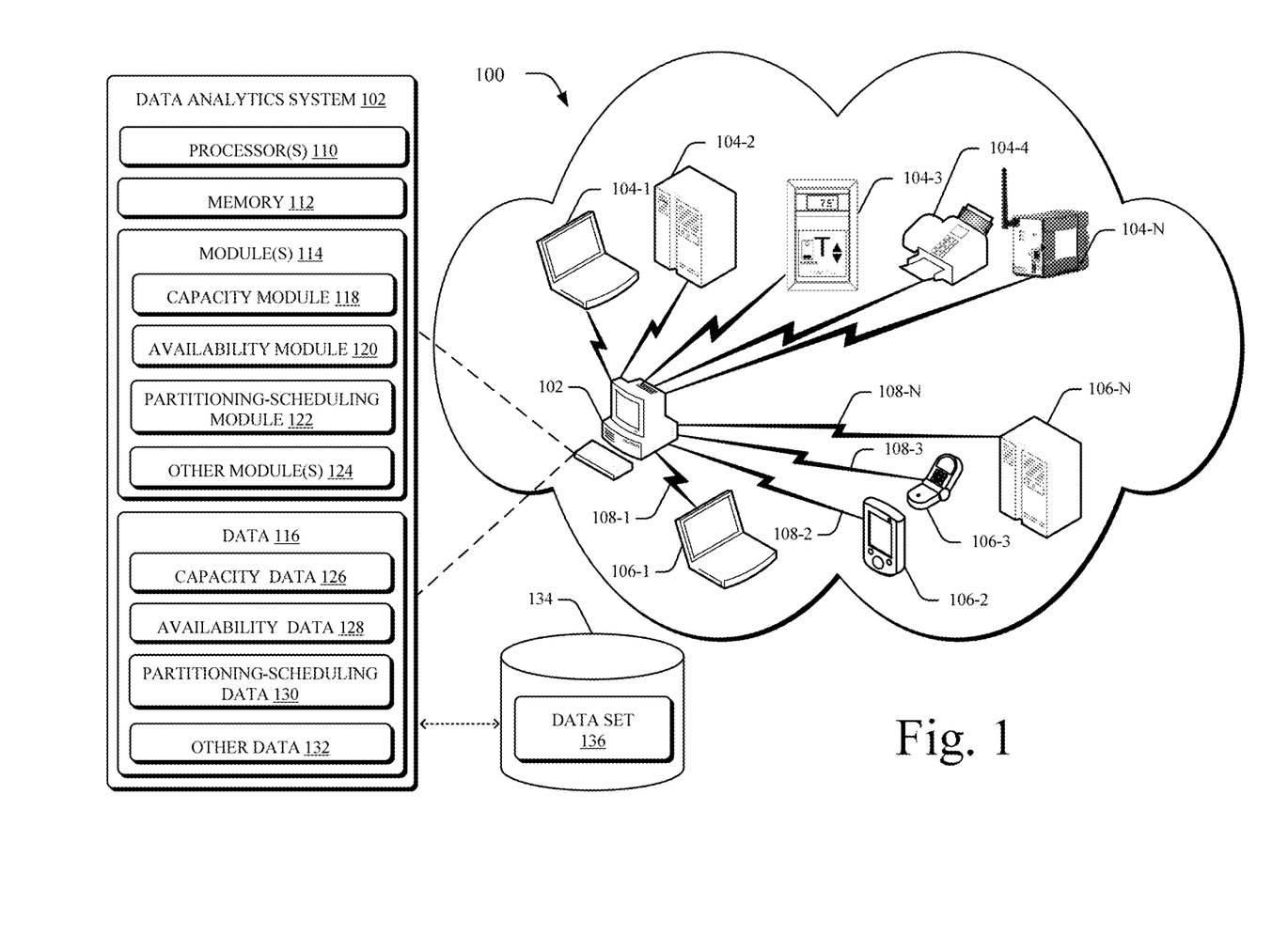
FIG. 1 illustrates a data analytics system for data partitioning in an internet-of-things (IoT) network, in accordance with an implementation of the present subject matter.

FIG. 1 illustrates an internet-of-things (IoT) network 100 implementing a data analytics system 102 for data partitioning in the internet-of-things (IoT) network 100, in accordance with an embodiment of the present subject matter. The IoT network 100 may be a wireless or a wired network, or a combination thereof. Further, the IoT network 100 can be a collection of individual networks, interconnected with each other and functioning as a single large network (e.g., the internet). In one example, such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Wi-Fi, Bluetooth, ZigBee, GPRS, Internet, and RAN and Integrated Services Digital Network (ISDN). Depending on the technology, the IoT network 100 may include various network entities, such as gateways, routers; however, such details have been omitted for ease of understanding.

In an implementation, the IoT network 100 can include a plurality of data collection devices 104-1, 104-2, 104-3, . . . 104-N, collectively referred to as data collection devices 104, to obtain real-time and historical data for monitoring activities of persons and devices, for various actions, such as prognosis, control, diagnosis, and for automated decision-making processes. For instance, the data collection devices can include various components, such as sensors including accelerometers, gyroscopes, audio sensors, temperature sensors, and light sensor; actuators; networked intelligence devices; desktop computers; mobile personal gadgets; building-automation devices; cellular phones; machine-to-machine (M2M) devices; hand-held devices; laptops or other portable computers; landline phones, and other such devices capable of providing data which can be used for the above mentioned purposes.

In an implementation, the data analytics system 102 can be responsible for accomplishing data analytics tasks on the data received from the data collection devices 104. In an example, the data analytics system 102 can be implemented as a workstation, a personal computer, say a desktop computer or a laptop, a multiprocessor system, a network computer, a minicomputer, or a server. In other words, the IoT network 100 may be a heterogeneous network having millions of distributed devices and objects connected to each other to exchange data. For example, to facilitate exchange of data between the data collection devices 104 and the data analytics system 102, multiple protocols, such as Transmission Control Protocol/Internet Protocol (TCP/IP), User Datagram Protocol (UDP), Constrained Application Protocol (CoAP), Datagram Congestion Control Protocol (DCCP) can be implemented in the IoT network 100.

For the purpose of achieving such tasks, the IoT network 100 can include a plurality of computing nodes 106-1, 106-2, 106-3 . . . 106-N, collectively referred to as computing nodes 106 and individually referred to as computing node 106, coupled to the data analytics system 102. In an example, the computing nodes 106 can include high-end servers, desktops, laptops, and tablet personal computers (PCs). In addition, the computing nodes 106 can include the intermittently available computing nodes, such as mobile phones and personal digital assistants (PDAs). For example, such devices 106 may move in or out of the network and may be available intermittently for assisting in computational functions in the IoT network 100. In another example, consider the case of a mobile phone which is available intermittently, say when in idle mode. In such a case, when the mobile phone is in charging mode and idle for a predetermined period of time, then the mobile phone can be understood to be available to be a part of the IoT network 100 and cooperate in data processing in the IoT network 100.

The data analytics system 102 can be coupled to each of the computing nodes 106 over one or more communication links 108-1, 108-2 . . . 108-N. The communication links 108-1, 108-2 . . . 108-N are collectively referred to as communication links 108 and individually referred to as communication link 108. Although the computing nodes 106 are shown as being separate from the data collection device 104 in the network, in certain cases, the data collection devices 104 can function as the computing nodes 106. In an implementation, the data analytics system 102 can be coupled to the computing nodes 106 through a distributed system manager (not shown) also referred to the IoT infrastructure manager which, as the name suggests, can serve as a control interface between the data analytics system 102 and the computing nodes 106 for operation.

In one implementation, the data analytics system 102 includes processor(s) 110 and memory 112. The processor 110 may be implemented as one or more microprocessors, microcomputers, microcontrollers, digital signal processors, central processing units, state machines, logic circuitries, and/or any devices that manipulate signals, based on operational instructions. Among other capabilities, the processor(s) is provided to fetch and execute computer-readable instructions stored in the memory 112. The memory 112 may be coupled to the processor 110 and can include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

Further, the data analytics system 102 may include module(s) 114 and data 116. The modules 114 and the data 116 may be coupled to the processors 110. The modules 114, amongst other things, include routines, programs, objects, components, data structures, etc., which perform particular tasks or implement particular abstract data types. In addition, the modules 114 may be implemented as signal processor(s), state machine(s), logic circuitries, and/or any other device or component that manipulate signals based on operational instructions.

In an implementation, the module(s) 114 include a capacity module 118, an availability module 120, a partitioning-scheduling module 122, and other module(s) 124. The other module(s) 124 may include programs or coded instructions that supplement applications or functions performed by the data analytics system 102. Additionally, in said implementation, the data 116 includes a capacity data 126, an availability data 128, a partitioning-scheduling data 130, and other data 132. The other data 132 amongst other things, may serve as a repository for storing data that is processed, received, or generated, as a result of the execution of one or more modules in the module(s). Further, although the data 116 is shown internal to the data analytics system 102, it may be understood that the data 116 can reside in an external repository (not shown in the figure), which may be operably coupled to the data analytics system 102. Accordingly, the data analytics system 102 may be provided with interface(s) (not shown) to communicate with the external repository to obtain information from the data 116.

Further, the data analytics system 102 can be coupled to a repository 134 having stored thereon the data set 136 to be processed. In an implementation, the repository 134 can be any type of database and may be a central data warehouse or a distributed warehouse.

In operation, the data analytics system 102 achieves data partitioning of the data set 136 to be processed, for example, analyzed, among the heterogeneous computing nodes 106 in the IoT network 100. According to an aspect, the data analytics system 102 achieves data partitioning based on the availability and computational capacity of the computing nodes 106 and communication links 108 associated with the computing nodes 106. Further, based on the partitioning, the data analytics system schedules the tasks for processing of data to be processed among the computing nodes 106.

In an implementation, for initiating data partitioning, the capacity module 118 can determine the number of computing nodes 106 connected to the data analytics system 102 in the IoT network 100. In an example, the capacity module 118 can interact with the IoT infrastructure manager to determine the number of computing nodes 106. In one case, the IoT infrastructure manager can provide the number of computing nodes 106 in the IoT network 100 at a given instant. For example, as explained above, certain computing nodes 106 may be intermittently unavailable and, therefore, the number of computing nodes 106 capable of contributing in processing of the data set 136. In an implementation, based on the number of computing nodes 106 connected with IoT network 100, the capacity module 118 can ascertain the number of data partitions to be achieved. The information regarding the number of computing nodes 106, say along with a time stamp of when the number is determined, is stored in the capacity data 126.

Further, the capacity module 118 can determine one or more capacity parameters associated with each computing node 106 in the IoT network. In addition, according to an aspect, the capacity module 118 can determine the capacity parameters associated with each of one or more communication links 108 between the data analytics system 102 and the computing nodes 106. In another example, the capacity module 118 can determine the capacity parameters associated with the communication links 108 between the computing nodes 106 can also be determined. In an example, the capacity parameters can be indicative of the computational capacity of the computing node 106 and that of the communication links 108. In one example, the capacity parameters associated with the computing node 106 can include processing speed of the computing node, available memory and associated bus speed, cache size, and operational load on that computing node 106 at a given point in time.

In addition, the capacity module 106 can determine historical load and predict future load on the computing nodes 106. In such a case, the capacity module 118 can obtain historical data relating the capacity of the computing nodes 106 from the IoT infrastructure manager. In another example, the capacity module 118 can monitor the computing nodes 106 and poll each of the computing nodes 106 to obtain information regarding the capacity parameters. Further, in an example, the capacity parameters determined for the communication links 108 can include data transfer rates for the communication link 108, Round Trip Time (RTT) for the communication link 108, packet drop rate, and the protocols used for data transfer, say User Datagram Protocol (UDP) and Transmission Control Protocol (TCP). In an implementation, the information regarding the computational capacity associated with the computing nodes 106 and the communication link 108 is stored in the capacity data 126.

Further, the availability module 120 determines an availability status of each computing node 106 and the communication link 108. In one case, the availability status can be indicative of a temporal availability of each computing node 106 and the communication link 108, at a given time instant. In one case, the availability module 120 can determine the availability of each network element, i.e., the computing node 106 and the communication link 108, on the basis of occurrence of an event in which the availability module 120 receives an event update, say periodically, from each network element 106, 108 on the basis of which the availability module 120 determines the availability status of the network element 106, 108. Such availability determination is referred to as event-based determination of availability.

In another example, the availability module 120 can determine the availability by proactively querying or polling each network element 106, 108 to determine availability status thereof. Such mode of availability determination is referred to as poll-based determination of availability. In yet another case, the determination of availability can be determined on the basis of an advertisement of availability or non-availability by the network elements 106, 108. Say, the computing node 106 can advertise or broadcast availability status and the availability module 120 can capture such statuses to ascertain the availability of the computing node 106. In addition, the availability status of each communication link 108 between the data analytics system and the computing nodes can be determined. In an example, the availability of a communication link 108 can be determined from the computing node 106 connected to that communication link 108, in the manner explained above.

In another implementation, the availability module 120 can determine the availability status of each network element 106, 108 based on historical availability data associated with the network element 106, 108. For instance, in one case, the availability module 120 can monitor the network elements 106, 108 being considered for participation in data processing and record availability of the network elements 106, 108 for a predetermined period of time. Accordingly, in said example, the availability module 120 can predict future availability of each network element 106, 108 based on the recorded information. In said example, the availability module 120 can employ statistical analysis techniques on the historical availability data for the network element 106, 108. In one implementation, the availability module 120 can store the information associated with the availability of each computing node 106 and each communication link 108 in the IoT network 100 in the availability data 128.

In another implementation, the availability module 120 can select few computing nodes 106 and communication links 108 from among those identified in the IoT network 100. In one case, the selection can be achieved based on the capacity parameters and availability status associated with each.

Subsequently, the partitioning-scheduling module 122 can make use of the information relating to computational capacity and availability of the computing nodes 106 and the communication links 108 for partitioning the data set 136 to be analyzed and scheduling tasks for processing the partitioned data. According to an aspect, the partitioning-scheduling module 122 can configure, based on the capacity parameters and the availability status associated with each computing element 106 and communication link 108, and the number of computing nodes 106 in the IoT network 100, a data partitioning scheme for distributing the data set 136 among the computing nodes 106 in the IoT network 100. As would be understood, in accordance the other implementation explained above, the partitioning-scheduling module 122 can achieve the partitioning of data based on the availability status and the capability parameters of the computing nodes 106 selected for the purpose of contributing to data processing, in addition to the availability and computational capacity of the communication links 108. Accordingly, the partitioning-scheduling module 122 can partition the data set 136 into smaller data subsets for parallel processing on the plurality of computing nodes 106.

According to an implementation, the partitioning-scheduling module 122 can partition the data set 136 to be analyzed based on one of time reduction-based partitioning scheme or cost reduction-based partitioning scheme, or a combination of the two schemes. In the time reduction-based scheme, the partitioning-scheduling module 122 can partition the data in order to reduce the overall time taken in processing and analysis of the entire data by the computing devices 106 while exchanging data over the communication links 108.

In case of the cost reduction scheme, the partitioning-scheduling module 122 can partition the data with the goal to reduce overall cost associated with the processing and analysis of data using the computing devices 106 and the communication links 108. In such a case, the partitioning-scheduling module 122 can take into account various costs, such as processing costs or costs incurred in acquisition of the computing nodes 106, the communication links 108, or both, for the purpose of carrying out the processing of data. In an example, the partitioning-scheduling module 122 can obtain the cost per unit time of computation for each computing node 106 from the IoT infrastructure manager.

In one example, the partitioning-scheduling module 122 can achieve the partitioning of the data set 136 in order to reduce both time and cost associated with the processing of data by the computing nodes 106 using the communication links 108. Such a scheme of partitioning of data is explained below with an example.

Consider a plurality of computing nodes 106 selected for participation in the data processing in the IoT network 100, i.e., the computing nodes 106 can donate their computation cycles for data processing in the IoT network 100. The computational cycles of each computing node 106 have a cost associated therewith for executing the task of data processing. As mentioned above, the objective of the data partitioning can be reduction of time for completion of the data processing task and reduction of cost of computation for the job. However, these two objectives (reduction of total completion time and reduction of total cost of computation) can be conflicting. Therefore, in one example, the partitioning scheme can be determined based on a joint optimization issue. Accordingly, the partitioning scheme can be determined considering weighted sums from the following function (F), as an example:

$$F = a*(\text{overall completion time}) + b*(\text{cost of computation})$$

In the above relation, a is the weight associated with the completion time for the job and b is the weight associated with the cost of computation of the job. In an implementation, the partitioning-scheduling module 122 can determine values of the weights a and b based on the relative relevance of the two factors, i.e., completion time and cost of computation. For instance, in case the completion time is the driving factor for data processing, then the partitioning-scheduling module 122 can select a higher value of a than b. On the other hand, if the driving factor for the data processing is the associated cost, then the partitioning-scheduling module 122 can select a higher value of b than a.

In an implementation, the information associated with the partitioning scheme and partition by the data analytics system 102 is stored in the partitioning-scheduling data 130.

Further, based on the partitioned data subsets or the partitioning scheme, and the capacity and availability of the computing nodes 106 and the communication links 108, the partitioning-scheduling module 122 can achieve scheduling of tasks of processing the data subsets to the computing nodes 106. In an implementation, partitioning-scheduling module 122 can employ the static scheduling techniques known in the art for scheduling the tasks for data processing.

Figure 2:
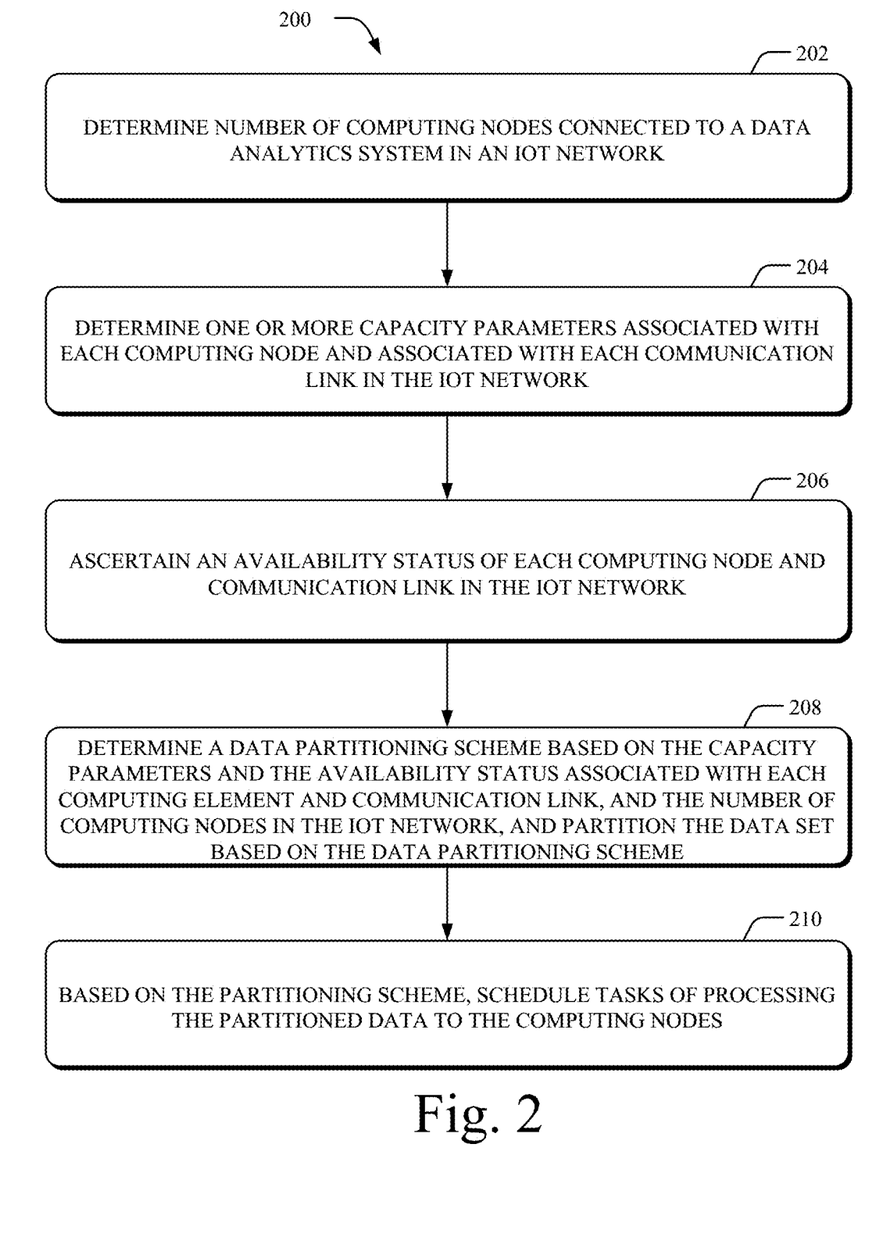
FIG. 2 illustrates a method for data partitioning in the internet-of-things (IoT) network, in accordance with an implementation of the present subject matter.

FIG. 2 illustrates a method 200 for data partitioning in an internet-of-things (IoT) network 100, according to an embodiment of the present subject matter. The order in which the method is described is not intended to be construed as a limitation, and any number of the described method blocks can be combined in any order to implement the method or any alternative method. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

In an implementation, one or more of the methods described herein may be implemented at least in part as instructions embodied in a non-transitory computer-readable medium and executable by one or more computing devices. In general, a processor, for example a microprocessor, receives instructions, from a non-transitory computer-readable medium, for example, a memory, and executes those instructions, thereby performing one or more methods, including one or more of the methods described herein. Such instructions may be stored and/or transmitted using any of a variety of known computer-readable media.

With reference to the description of FIG. 2, for the sake of brevity, the details of the components of the data analytics system 102 are not discussed here. Such details can be understood as provided in the description provided with reference to FIG. 1.

Referring to FIG. 2, at block 202, number of computing nodes 106 connected to the data analytics system 102 in the IoT network 100 is determined. In an implementation, based on the number of computing nodes 106 connected with IoT network 100, the number of data partitions to be achieved can be determined.

At block 204, one or more capacity parameters associated with each computing node 106 and those associated with each communication link 108 in the IoT network 100 are determined. In an implementation, the capacity parameters can be determined based on historical load and predicted future load on the computing nodes 106 and the communication links 108. Further, in an example, the capacity parameters can be determined for the communication links 108 between the data analytics system 102 and the computing nodes 106. In another example, in addition, the capacity parameters can be determined for the communication links 108 between two or more computing nodes 106. In one example, the capacity parameters associated with the computing node 106 can include processing speed of the computing node, available memory and associated bus speed, cache size, and operational load on that computing node 106 at a given point in time, whereas the capacity parameters determined for the communication links 108 can include data transfer rates for the communication link 108.

At block 206, an availability status of each computing node 106 and communication link 108 in the IoT network 100 is determined. In one case, the availability status can indicate a temporal availability of each computing node 106 and communication link 108, at a given time instant. In this example, the availability status is determined on the basis of occurrence of an event for which an update is received, say periodically, from each computing node 106 and communication link 108.

In another example, the determination of availability is poll-based where each computing node 106 and communication link 108 is proactively polled to obtain the availability status thereof. In yet another example, the determination of availability can be advertisement-based where availability status is determined on the basis of an advertisement of availability or non-availability by each computing node 106 and communication link 108. In addition, in one example, the availability status of each communication link 108 between the data analytics system and the computing nodes can be determined.

In another implementation, the availability status of each computing node 106 and communication link 108 can be determined based on historical availability data associated with each computing node 106 and communication link 108.

At block 208, based on the capacity parameters and the availability status associated with each computing element 106 and communication link 108, and the number of computing nodes 106 in the IoT network 100, a data partitioning scheme for partitioning the data set 136 into a plurality of data subsets and distributing among the computing nodes 106 in the IoT network 100 can be determined. Consequently, the data set 136 to be processed can be partitioned and distributed among the computing nodes 106 on the basis of the partitioning scheme. In one example, the data partitioning scheme can be one of time reduction-based partitioning scheme or cost reduction-based partitioning scheme, or a combination thereof.

At block 210, based on the partitioning scheme, tasks of processing the data subsets can be scheduled to the computing nodes 106. As will be understood, the computational capacity and availability status of the computing nodes 106 and the communication links 108 can be factors taken into account while scheduling the data processing tasks to the computing nodes 106.

Although implementations for methods and systems for data partitioning in an internet-of-things (IoT) network are described, it is to be understood that the present subject matter is not necessarily limited to the specific features or methods described. Rather, the specific features and methods are disclosed as implementations for data partitioning in an internet-of-things (IoT) network.

We claim:

1. A computer implemented method for data partitioning and scheduling a data processing task associated with an application in an internet-of-things (IoT) network, the computer implemented method comprising:

receiving a data set for executing a data processing task in a dynamic IoT network;

determining, by a processor, a number of heterogeneous computing nodes in the dynamic IoT network capable of contributing in processing of the data set at a given time instance, wherein the data processing task is associated with at least one executable task of a software application, wherein the dynamic IoT network comprises distributed devices, data collection devices, objects and heterogeneous computing nodes connected to a data analytics system over one or more communication links, wherein the heterogeneous computing nodes comprises intermittently available computing nodes comprising mobile phones and/or personal digital assistants which voluntarily move in or out of the dynamic IoT network and are intermittently available for assisting in computational functions in the dynamic IoT network, and wherein the one or more communication links are wired or wireless communication channels;

ascertaining, by the processor, at least one capacity parameter associated with each of the computing nodes in the dynamic IoT network and with each of the one or more communication links between each of the computing nodes and the data analytics system at the given time instance, the at least one capacity parameter being indicative of a computational capacity for each of the computing nodes and communication capacity for each of the one or more communication links;

determining, by the processor, an availability status of each of the computing nodes and each of the one or more communication links at the given time instance based on at least one of advertisement-based, event-based, poll-based or historical availability data, wherein the availability status is indicative of temporal availability of each of the computing nodes and each of the one or more communication links at the given time instance, and wherein the computing nodes are dynamically available intermittently for assisting in computational functions of the data analytics system; and dynamically partitioning, by the processor, the data set into subsets, based on the number of the computing nodes available at the given time instance, the capacity parameter associated with each of the available computing nodes and each of the available one or more communication links at the given time instance, and the availability status of each of the computing nodes and each of the one or more communication links at the given time instance, for parallel processing of the subsets on the available computing nodes, wherein the subsets are subdivided executable tasks, wherein subsequent processing is based on the number of computing nodes determined for dynamic data partitioning at the given time instance until the number of computing nodes is determined again at a next given time instance; and scheduling the data processing task to the available computing nodes based on the dynamic data partitioning, wherein one instance of the data processing task associated with the data set is executed on each subset of the subsets in parallel for processing each subset to execute the data processing task, thereby the data processing task of the data set is reduced to n instances of parallel and independent execution of the data processing task; and receiving and combining results of the data processing task received from the available computing nodes at each time instance based on the data processing task to obtain an overall result.

2. The computer implemented method as claimed in claim 1, wherein the at least one capacity parameter associated with each computing node comprises processing speed of the computing node, available memory and associated bus speed, cache size, and operational load on the computing node at a given point in time.

3. The computer implemented method as claimed in claim 1, wherein the at least one capacity parameter associated with each communication link comprises data transfer rates for the communication link.

4. The computer implemented method as claimed in claim, 1, wherein the partitioning is at least one of time reduction-based and cost reduction-based.

5. A data analytics system for data partitioning and scheduling data processing task associated with an application in an internet-of-things (IoT) network, wherein the IoT network comprises distributed devices, data collection devices, objects and heterogeneous computing nodes connected to the data analytics system over one or more communication links, the data analytics system comprising:

a processor; and a memory coupled to the processor, the processor executes a plurality of modules stored in the memory, wherein the plurality of modules comprises:

a capacity module coupled to the processor to:

receive a data set for executing a data processing task in a dynamic IoT network;

determine a number of heterogeneous computing nodes in the dynamic IoT network capable of contributing in processing of the data set at a given time instance, wherein the data processing task is associated with at least one executable task of a software application, and the one or more communication links are wired or wireless communication channels, wherein the heterogeneous computing nodes comprises intermittently available computing nodes comprising mobile phones and/or personal digital assistants which voluntarily move in or out of the dynamic IoT network and are intermittently available for assisting in computational functions in the dynamic IoT network; and ascertain at least one capacity parameter associated with each of the computing nodes in the dynamic IoT network and with each of the one or more communication links between each of the computing nodes and the data analytics system at the given time instance, the capacity parameter being indicative of a computational capacity for each of the computing nodes and communication capacity for each of the one or more communication links; and an availability module coupled to the processor to determine an availability status of each of the computing nodes and each of the one or more communication links at the given time instance based on at least one of advertisement-based, event-based, poll-based or historical availability data, wherein the availability status is indicative of temporal availability of each of the computing nodes and each of the one or more communication links at the given time instance, and wherein the computing nodes are dynamically available intermittently for assisting in computational functions of the data analytics system; and a partitioning-scheduling module coupled to the processor to:

dynamically partition the data set into subsets, based on the number of the computing nodes available at the given instance, the capacity parameter associated with each of the available computing nodes and each of the one or more communication links, and the availability status of each of the computing nodes and each of the one or more communication links at the given time instance, for parallel processing of the subsets on the available computing nodes, wherein the subsets are subdivided executable tasks, wherein subsequent processing is based on the number of computing nodes determined for dynamic data partitioning at the given time instance until the number of computing nodes is determined again at a next given time instance;

schedule the data processing task to the available computing nodes based on the dynamic data partitioning, wherein one instance of the data processing task associated with the data set is executed on each subset of the subsets in parallel for processing each subset to execute the data processing task, thereby the data processing task of the data set is reduced to 'n' instances of parallel and independent execution of the data processing task; and receive and combine results of the data processing task received from the available computing nodes at each time instance based on the data processing task to obtain an overall result.

6. The data analytics system as claimed in claim 5, wherein the partitioning-scheduling module schedules data processing tasks based on static scheduling techniques.

7. The data analytics system as claimed in claim 5, wherein the partitioning-scheduling module achieves at least one of time reduction-based partitioning and cost reduction-based partitioning of the data set.

8. A non-transitory computer-readable medium having embodied thereon a computer program for executing a method for data partitioning and scheduling data processing task associated with an application in an internet-of-things (IoT) network, the method comprising:

receiving a data set for executing a data processing task in a dynamic IoT network;

determining a number of heterogeneous computing nodes in the dynamic IoT network capable of contributing in processing of the data set at a given time instance, wherein the data processing task is associated with at least one executable task of a software application, wherein the dynamic IoT network comprises distributed devices, data collection devices, objects and heterogeneous computing nodes connected to a data analytics system over one or more communication links, wherein the heterogeneous computing nodes comprises intermittently available computing nodes comprising mobile phones and/or personal digital assistants which voluntarily move in or out of the dynamic IoT network and are intermittently available for assisting in computational functions in the dynamic IoT network, and the one or more communication links are wired or wireless communication channels;

ascertaining at least one capacity parameter associated with each of the computing nodes in the dynamic IoT network and with each of the one or more communication links between each of the computing nodes and the data analytics system at the given time instance, the at least one capacity parameter being indicative of a computational capacity for each of the computing nodes and communication capacity for each of the one or more communication links;

determining an availability status of each of the computing nodes and each of the one or more communication links at the given time instance based on at least one of advertisement-based, event-based, poll-based or historical availability data, wherein the availability status is indicative of temporal availability of each of the computing nodes and each of the one or more communication links at the given time instance, and wherein the computing nodes are dynamically available intermittently for assisting in computational functions of the data analytics system;

dynamically partitioning the data set into subsets, based on the number of the computing nodes available at the given time instance, the capacity parameter associated with each of the available computing nodes and each of the one or more available communication links at the given time instance, and the availability status of each of the computing nodes and each of the one or more communication links at the given time instance, for parallel processing of the subsets on the plurality of available computing nodes, wherein the subsets are subdivided executable tasks, wherein subsequent processing is based on the number of computing nodes determined for data partitioning at the given time instance until the number of computing nodes is determined again at a next given time instance; and scheduling the data processing task to the available computing nodes based on the dynamic data partitioning, wherein one instance of the data processing task associated with the data set is executed on each subset of the subsets in parallel for processing each subset to execute the data processing task, thereby the data processing task of the data set is reduced to 'n' instances of parallel and independent execution of the data processing task; and receiving and combining results of the data processing task received from the available computing nodes at each time instance based on the data processing task to obtain an overall result.

9. The non-transitory computer-readable medium as claimed in claim 8, wherein the ascertaining the availability status is at least one of advertisement-based, event-based, poll-based and based on historical availability data.

10. The non-transitory computer-readable medium as claimed in claim 8, wherein the partitioning is at least one of time reduction-based and cost reduction-based.

11. The data analytics system of claim 5, wherein the at least one capacity parameter associated with each of the computing nodes comprises processing speed of a computing node, available memory and associated bus speed, cache size, and operational load on each of the computing nodes at a given point of time and the at least one capacity parameter associated with each of the one or more communication links comprises data transfer rates for the one or more communication links.

12. The method as claimed in claim 1, wherein the heterogeneous computing nodes comprises high-end servers, desktops, laptops, tablet, personal computers, mobile phones and personal digital assistant.

13. The data analytics system of claim 5, wherein the heterogeneous computing nodes comprises high-end servers, desktops, laptops, tablet, personal computers, mobile phones and personal digital assistant.

* * * * *

UNITED STATES PATENT AND TRADEMARK OFFICE
CERTIFICATE OF CORRECTION

PATENT NO. : 10,516,726 B2
APPLICATION NO. : 14/498619
DATED : December 24, 2019
INVENTOR(S) : Himadri Sekhar Paul Page 1 of 1

It is certified that error appears in the above-identified patent and that said Letters Patent is hereby corrected as shown below:

In the Claims

<u>Column 16, Line 1:</u>
Claim 8, "parallel processing of the subsets on the plurality of available computing" should read, --parallel processing of the subsets on the available computing--.

Signed and Sealed this
Sixth Day of October, 2020

Andrei Iancu
*Director of the United States Patent and Trademark Office*